Patented Apr. 16, 1946

2,398,418

UNITED STATES PATENT OFFICE 2,398,418

INTRODUCTION OF ORGANIC RADICALS INTO QUINONES

Louis F. Fieser, Belmont, Mass.

No Drawing. Application August 27, 1943, Serial No. 500,288

14 Claims. (Cl. 260—396)

This invention relates to a novel method of introducing organic radicals into quinone compounds.

The purpose of the invention is to provide a method of general utility for the introduction of organic radical substituents into quinonoid ring compounds.

Heretofore various methods have been developed for the introduction of organic radicals, including alkyl and aryl groups, into the nucleus of quinones, but the known methods are all subject to considerable limitations and disadvantages. Thus, one method consists in the condensation of a quinone with an aromatic component in the presence of aluminum chloride, for example, as described by Pummerer and Prell, Ber., 55, 3105 (1922). The condensing agent is destructive to the sensitive quinones, yields usually are poor, and the method is limited exclusively to the introduction of aryl groups. In another method involving, for example, the condensation of hydroxynaphthoquinone with diphenylcarbinol, Möhlau and Klopfer, Ber. 32, 2146 (1899), the process is limited entirely to compounds of the diphenylcarbinol type. A somewhat more general reaction, although still very limited in scope, is that of Hooker, J. Am. Chem. Soc., 69, 1355, (1896), consisting in the condensation of a hydroxynaphthoquinone with an aldehyde under carefully controlled conditions. This reaction has been applied to the production of a certain number of alpha alkenyl derivatives of hydroxynaphthoquinone but is limited to the production of compounds of this type, and, of course, is applicable only in those rather few instances where the appropriate aldehyde starting material is available. Another method is by the alkylation of the silver salt of hydroxynaphthoquinone with an allyl type or benzyl type halide of enhanced reactivity, as described by Fieser, J. Am. Chem. Soc., 38, 3203 (1926). The reaction is applicable only to alkyl halides of a particular type and the C-alkyl derivative is but one of three reaction products. The yields are thus often very low, as, for example, in the synthesis of lapachol by this method, Fieser, J. Am. Chem. Soc., 89, 857 (1927). Another highly specialized method of introducing carbon substituents into quinones is that employed in the synthesis of vitamin K₁, J. Am. Chem. Soc., 61, 3467 (1939). Here application is limited to beta alkenyl substituted quinones and a specially reactive alcohol of the allylic type is required as a starting material. A certain number of aryl substituted quinones have been made by the interaction of a diazonium salt with a quinone as described, for example, in U. S. Patent 1,735,432 and by Kvalnes, J. Am. Chem. Soc., 56, 2478 (1934); see also Neunhoeffer and Weise, Ber., 71, 2703 (1938). This method often results in very poor yield, and in any case is applicable only to the introduction of aryl substituents. A further reaction of extremely limited scope is the methylation of a quinone with diazomethane through the intermediate pyrazoline, Fieser and Hartwell, J. Am. Chem. Soc., 57, 1479 (1935).

It will be obvious that the methods known to the prior art are very limited in their application and that each requires very specialized starting materials and can be used only for the production of substituted quinones of a particularly limited type. The present invention involves a hitherto wholly unknown reaction of quinones which affords a very satisfactory method of broad and general scope, making it possible to prepare easily and in a state of high purity, and with utilization of easily obtainable starting materials, quinones containing all manner of organic substituents.

I have found that by effecting the decomposition of a carboxylic acid in solution in a liquid medium with liberation of carbon dioxide in the presence of a quinone having at least one unsubstituted hydrogen in the quinonoid ring, the organic radical of the decarboxylated acid is introduced into the quinonoid ring, producing a quinone compound substituted in the quinonoid ring by the organic radical.

The decomposition of the acid in solution with evolution of carbon dioxide can be effected in a variety of ways, some already known and some discovered in the present work. Thus, it has long been known that diacyl peroxides decompose in this manner, for example, when heated in acetic acid or ligroin solution or in the presence of other solvents permitting application of temperatures in the range of about 50–150° C. It has also been long known that acids can be caused to lose carbon dioxide by the electrolysis of an alkali metal salt of the acid, as in the familiar Kolbe synthesis. It has been found that the tetravalent lead esters of carboxylic acids decompose in solution with evolution of carbon dioxide when the solution is boiled vigorously with the addition of a small amount of benzene or toluene. The reaction sets in at a distinctly lower temperature if certain promoter substances are added, for example, malonic acid, acetoacetic ester, methanol.

The new method of synthesis is based upon the discovery that if a quinone having an unsubstituted hydrogen in the quinonoid ring is present in a solution at the time the decarboxylation reaction is induced, for example, by one of the above means, the hydrocarbon residue of the acid from which carbon dioxide has been liberated becomes affixed to the quinone ring with displacement of the original hydrogen atom. Alkyl, alkenyl, aralkyl and aryl substituted quinones are thereby produced in an extraordinarily simple and efficient manner and many experiments have shown the fact that the substituent introduced has the exact original form of the decarboxylated radical of the acid.

From the many publications on the Kolbe synthesis and on the decomposition of diaryl peroxides (see Hey and Waters, Chem. Rev., 21, 186 (1937)) and of the peroxide of aliphatic acid (Kharasch, Kane, and Brown, J. Am. Chem. Soc., 63, 526 (1941)), it would appear possible that free radicals are involved in the new quinone reaction. The interesting question of the mechanism of the reaction, however, is not essential to the practical utilization of the invention. The experiments cited in the examples merely illustrate a general process for the introduction of carbon substituents and do not disclose the intimate mechanism by which the reaction proceeds. Indeed, the reaction can be applied in various experimentally different ways. Advantageous procedures for applying the method of the invention to useful synthesis are as follows:

In one, a solution of the quinone and an excess of a tetravalent lead compound of the carboxylic acid in acetic or propionic acid is heated at the reflux temperature until decomposition occurs with gas evolution, or else a promoter substance of the type already noted is added to induce reaction at a temperature of about 80-95°. Another procedure consists in heating a mixture of the quinone, a tetravalent lead oxide compound, such as red lead, and a promoter substance in the presence of an excess of the acid whose decarboxylated residue is to be introduced. The reaction can also be effected with a mixture of an acid, the corresponding chloride of the acid, and red lead. Whether or not in these last two instances a tetravalent lead ester is an intermediate product is not certain. Some derivative of the acid capable of readily losing carbon dioxide evidently is produced and hence the reaction falls into the general definition given.

Another useful procedure is to prepare the diacyl peroxide derivative of the acid and heat a solution of this peroxide and of the quinone in a solvent of boiling point in the neighborhood of 75-100°; acetic acid and ligroin are particularly convenient. A useful variation of this procedure utilizes the acid chloride having the required carbon residue. This is dissolved in the cold in propionic acid, or any acid liquid at 0°, and the solution is cooled with ice while slowly adding an equivalent amount of sodium peroxide. The quinone is then added, with or without filtration of the precipitated sodium chloride, and heating is conducted in the usual manner. Again the nature of the active intermediate has not been established, but this variation of the general process is presented as a convenient method of effecting the synthesis.

The method of the invention has been found to be effective with a wide variety of quinones, including alkyl, hydroxy, alkoxy, acylamino and halogen derivatives of benzo- and naphthoquinones, and it has been found possible to introduce into the quinones a wide variety of organic radicals, including saturated and unsaturated aliphatic radicals, both straight chained and branched, containing from one to twenty-two carbon atoms, and aralkyl and aryl radicals. The organic radicals may include, for example, halogen, nitro, alkoxy, carboxylic acid and ester derivatives.

As was pointed out above, the carboxylic acid compounds which are effective in the method of the invention are characterized by being decomposable with liberation of carbon dioxide under the conditions of the reaction. In general, such derivatives of any carboxylic acid containing at least two carbon atoms may be used. Typical of the carboxylic acid compounds effective in the method of the invention are peroxides and tetravalent lead (plumbic) salts of carboxylic acids or mixtures which are equivalent to such compounds, for example, carboxylic acids, and a tetravalent lead oxide compound, such as red lead or lead dioxide.

The reaction of the carboxylic acid compound with the quinone can usually be promoted by a large number of substances. Among the effective promoters for the reaction are water; alcohols, such as methanol, isopropyl and t-butyl alcohol; ethers, for example, isopropyl ether; hydrocarbons, such as benzene, toluene, cyclohexane, and n-octane; acids, such as malonic, tartronic, and methyl malonic acids; and esters, such as ethyl acetoacetate and diethyl malonate.

In general, the reaction proceeds smoothly at moderate temperatures in the range of 50° to 150° C. The reaction is preferably carried out in a liquid medium such as a liquid hydrocarbon, for example, ligroin, or acids such as acetic or propionic acid. An excess of the carboxylic acid involved in the reaction may advantageously be used as a liquid medium.

The following examples are illustrative of the principles of the invention:

*1. 2,3-dimethyl-1,4-naphthoquinone*

(a) A solution of 0.86 g. of 2-methyl-1,4-naphthoquinone (I) and 0.6 g. of malonic acid in 15 cc. of acetic acid was treated with 5 gm. of lead tetraacetate and heated on a water bath to 50-60° C. The heating was continued at 75° with addition of lead tetraacetate in 2 g. portions until no further evolution of gas occurred on heating and an excess of lead tetraacetate was present. A total of 10.5 gm. of lead tetraacetate was used. The excess reagent was destroyed with 6 drops of glycerol. The reaction mixture was poured into water and the crystalline yellow precipitate of 2,3-dimethyl-1,4-naphthoquinone was separated.

The same product is obtained when the reaction is carried out at the temperature of the steam-bath.

When diethyl malonate, methyl malonic acid and tartronic acid were substituted for malonic acid in the foregoing procedure, similar results were obtained.

(b) 0.86 g. of I and 0.6 cc. of ethyl acetoacetate in 15 cc. of acetic acid were heated on a steambath and 9.3 g. of lead tetraacetate was added. The same product was obtained as in (a).

(c) A mixture of 0.86 g. of I, 8.8 gm. lead tetraacetate and 10 cc. of acetic acid were heated on the steam-bath and a solution of 1.03 gm. of C-ethyl ethyl acetoacetate in 5 cc. of acetic acid was run in from a dropping funnel in the course of one-half hour during which time gas was evolved steadily. After heating for one and one-half hours excess lead tetraacetate was still present. The reaction mixture was diluted and the 2,3-dimethyl-1,4-naphthoquinone was extracted with ether.

(d) A solution of 0.86 gm. of I in 15 cc. of acetic acid and 5 cc. of methanol was treated at steam-bath temperature with a total of 9 g. of lead tetraacetate, added in portions. The product was isolated as in example (a).

(e) A mixture of 5.16 g. of I, 30 cc. of acetic acid and 25 g. of lead tetraacetate was heated to reflux temperature. The reaction started promptly with vigorous gas evolution. As the reagent was used up, further 5 g. portions were added until a total of 67 g. of lead tetraacetate had been added. Refluxing was continued for a total of five hours. The reaction mixture was poured into water and the product isoluated as described above.

(f) A mixture of 1.72 g. I, 50 cc. of acetic acid, 1.3 cc. of acetoacetic ester, and 13.6 g. of red lead was treated with 1.56 g. of acetyl chloride. The red color was discharged almost immediately and the mixture became warm. Heating was then continued on the steam-bath with the addition of 13.6 g. more red lead in two portions. Gas was evolved and after 40 minutes of heating on the steam-bath the solution was filtered and 2,3-dimethyl-1,4-naphthoquinone separated as fine yellow needles.

(g) 1 g. of I and 0.75 g. of diacetyl peroxide in 14 cc. of acetic acid were heated at 90–95° C. until effervescence ceased. On cooling the solution and pouring in water, 2,3-dimethyl-1,4-naphthoquinone was precipitated.

2. *2-methyl-3-ethyl-1,4-naphthoquinone*

(a) A solution of 3.44 g. of 2-methyl-1,4-naphthoquinone and 3.2 cc. of ethylacetoacetate in 50 cc. of propionic acid was heated with stirring on the steam-bath and 60 g. of red lead was added in 5 g. portions. The first 40 g. of red lead was consumed within forty-five minutes and the remainder had largely disappeared after a total time of about two hours. Heating and stirring were continued for a total of three hours. The reaction mixture was cooled and the 2-methyl-3-ethyl-1,4-naphthoquinone was extracted with ether.

(b) 1.86 g. of 2-ethyl-1,4-naphthoquinone was methylated with lead tetraacetate in acetic acid in the presence of malonic acid by the procedure of Example 1(a). The same product was obtained as in Example 2(a).

3. *2-methyl-3-n-propyl-1,4-naphthoquinone*

(a) 1.72 g. of 2-methyl-1,4-naphthoquinone, and 1.5 g. of malonic acid in 45 cc. of n-butyric acid were treated at steam-bath temperature with 35.7 g. of red lead. The mixture was poured into water and the 2-methyl-3-n-propyl-1,4-naphthoquinone was extracted with ether.

(b) The same product was obtained by methylating 2-n-propyl-1,4-naphthoquinone with lead tetraacetate in the presence of malonic acid in boiling acetic acid.

4. *2-methyl-3-isopropyl-1,4-naphthoquinone*

(a) This substance was obtained by alkylating 2-methyl-1,4-naphthoquinone with isobutyric acid and red lead by the procedure of Example 3 (a).

(b) The same substance was obtained by methylating 2-isopropyl-1,4-naphthoquinone in boiling acetic acid solution with lead tetraacetate and malonic acid.

5. *2-methyl-3-n-heptyl-1,4-naphthoquinone*

1.72 g. of 2-methylnaphthoquinone was alkylated with 30 cc. of n-caprylic acid, 1.5 cc. of diethyl malonate and 35 g. of red lead in an oil bath at 120–130° C. The reaction mixture was poured into water and the product was extracted with ether.

6. *2-methyl-3-benzyl-1,4-naphthoquinone*

A mixture of 1.72 g. of 2-methylnaphthoquinone, 35 g. of phenylacetic acid, 1.7 cc. of ethyl acetoacetate and excess red lead was heated at 110–120° C. with stirring. Toward the end of the reaction benzene was added to facilitate stirring. The product was extracted from the reaction mixture with ether.

7. *2-methyl-3-β-phenylethyl-1,4-naphthoquinone*

1.7 g. of 2-methylnaphthoquinone, 25 g. of hydrocinnamic acid, 1.7 cc. of ethyl acetoacetate and excess red lead were reacted at 120–130° C. for four hours. The product separated from the reaction mixture on cooling.

8. *2-methyl-3-pentadecyl-1,4-naphthoquinone*

A solution of 1 g. of dipalmitoyl peroxide in 10 cc. of purified ligroin (B. P. 95–100° C.) was treated with 0.25 g. of 2-methylnaphthoquinone, a chip of porous pot was added and the mixture was warmed and stirred until the quinone had dissolved. The bath temperature was gradually raised until effervescence set in at 90° and after one hour the temperature was raised to 100° during thirty minutes and then allowed to fall to 90° when gas evolution had ceased. The 2-methyl-3-pentadecyl-1,4-naphthoquinone crystallized from the solution on cooling.

9. *2-methyl-3-heptadecyl-1,4-naphthoquinone*

This substance was made from 2-methylnaphthoquinone and distearoyl peroxide by the procedure of Example 8.

10. *2-methyl-3-heneicosenyl(12')-1,4-naphthoquinone*

This substance was made made from 2-methylnaphthoquinone and the peroxide of erucic acid by the procedure of of Example 8.

11. *2-methyl-3-nor-chaulmoogryl-1,4-naphthoquinone*

This substance was made from 2-methylnaphthoquinone and the peroxide of chaulmoogric acid by the procedure of Example 8.

12. *2-methyl-3-decenyl(9')-1,4-naphthoquinone*

This substance was made from 2-methylnaphthoquinone and the peroxide of undecenoic acid by the procedure of Example 8.

13. *2-methyl-3-hexadecenyl(1')-1,4-naphthoquinone*

This substance was made from 2-methylnaphthoquinone and the peroxide of 2-heptadecenoic acid by the procedure of Example 8.

14. *2-methyl-3-undecyl-1,4-naphthoquinone*

Made by heating 2-methylnaphthoquinone with the peroxide of lauric acid in acetic acid solution at 85°–95° C.

15. *2-methyl-3-tridecyl-1,4-naphthoquinone*

Made by heating 2-methylnaphthoquinone with the peroxide of myristic acid in acetic acid or ligroin at 85–95° C.

16. 2-methyl-3-chloromethyl-1,4-naphthoquinone

Made by heating 2-methylnaphthoquinone with the peroxide of chloroacetic acid in acetic acid solution at 70–80° C.

17. 2-methyl-3-bromomethyl-1,4-naphthoquinone

Made by heating 2-methylnaphthoquinone with the peroxide of bromoacetic acid in acetic acid at 85°–95° C.

18. 2-methyl-3-p-bromophenyl-1,4-naphthoquinone

Made by heating 2-methylnaphthoquinone with the peroxide of p-bromobenzoic acid in acetic acid at 105–115°.

19. 2-methyl-3-m-bromophenyl-1,4-naphthoquinone

Made by heating 2-methylnaphthoquinone with the peroxide of m-bromobenzoic acid in acetic acid at 115°–118° C.

20. 2-methyl-3-p-tolyl-1,4-naphthoquinone

Made by heating 2-methylnaphthoquinone with the peroxide of p-toluic acid in acetic acid at 110–120° C.

21. 2-methyl-3-m-tolyl-1,4-naphthoquinone

Made by heating 2-methylnaphthoquinone with the peroxide of m-toluic acid in acetic acid at 110–120° C.

22. 2-methyl-3-p-nitrophenyl-1,4-naphthoquinone

Made by heating 2-methylnaphthoquinone with the peroxide of p-nitrobenzoic acid in acetic acid at 110–120° C.

23. 2-methyl-3-m-nitrophenyl-1,4-naphthoquinone

Made by heating 2-methylnaphthoquinone with the peroxide of p-nitrobenzoic acid in acetic acid at 110–120° C.

24. β-(2-methyl-1,4-naphthoquinonyl-3)-propionic acid (a) 2-methylnaphthoquinone (3.00 g.) was dissolved in 30.5 g. of methyl hydrogen succinate, prepared from succinic anhydride and methanol, together with 3.00 g. of ethyl ethylacetoacetate. The mixture was brought to 100° on the steam bath, and 48.0 g. of $Pb_3O_4$ were added in small portions with mechanical stirring over a period of three hours. At the end of this time the flask was transferred to a metal bath, and the reaction was allowed to proceed at a temperature of 120–130°. A few drops of benzene were added from time to time, and stirring was continued until the reaction mixture thickened. At the end of twelve hours the pasty mass was extracted alternately with ether and hot benzene, and the combined extracts were concentrated to a volume of about 100 cc. and shaken with sodium bicarbonate. Large amounts of a fine white precipitate which was probably formed from a soluble organic lead salt separated under this treatment. Clarification with norite gave a yellow solution which was concentrated to an oil under reduced pressure.

Hydrolysis of this material was effected by refluxing for 1½ hours with 30 cc. of 5% potassium hydroxide solution containing 8.0 g. of sodium hydrosulfite. The alkaline hydrolysate was then acidified with glacial acetic acid and extracted with ether, following which the combined ether extracts were washed once with saturated brine and shaken with 2.0 g. of silver oxide and 4.0 g. of anhydrous magnesium sulfate. The solution was finally filtered, and the ether was replaced with benzene on the steam bath. Saturation with ligroin gave 240 mg. of yellow product melting at 139.0–142.5°, which on two recrystallizations melted at 142.5°–144.0°.

(b) 2-methylnaphthoquinone (2.24 g., 0.013 mole) was dissolved in glacial acetic acid at a temperature just below the boiling point and treated with 3.04 g. (0.013 mole) of disuccinoyl peroxide (Clover and Houghton, Am. Chem. J., 32, 60 (1904)) in small portions. Large volumes of carbon dioxide were evolved following each addition, and after all the peroxide had been added, the solution was cooled and made alkaline to litmus with dilute sodium carbonate solution containing a small amount of sodium hydrosulfite. The basic solution was washed once with ether, acidified with glacial acetic acid, and extracted four times with ether, whereupon the combined ether fractions were washed with saturated brine and shaken with 4.0 g. of silver oxide and 4.0 g. of anhydrous magnesium sulfate. The resulting solution was filtered (norite), and after removal of the solvent, the residue was crystallized from benzene-ligroin, yielding 640 mg. of bright yellow crystals melting at 142–144°.

25. α-(2-methyl-1,4-naphthoquinonyl-3)-butyric acid

Diglutaroyl peroxide (4.45 g., 0.017 mole), prepared from glutaric anhydride and hydrogen peroxide by the method of Clover and Houghton, (Clover and Houghton, Am. Chem. J., 32, 60 (1904)), was added in small portions to a solution of 2.92 g. of 2-methylnaphthoquinone dissolved in 5 cc. of glacial acetic acid. The reaction was carried out at a temperature just below the boiling point of the mixture, and each addition was followed by the vigorous evolution of carbon dioxide. After all the peroxide had been added, the solution was diluted with water and neutralized with 10% sodium carbonate, containing a small amount of sodium hydrosulfite to convert the quinone to the alkali-stable hydroquinone. The alkaline liquor was washed with ether to remove unreacted starting material, acidified with acetic acid, and extracted with ether. The combined ether fractions were then washed with saturated brine, dried over anhydrous magnesium sulfate, and shaken with 3.0 g. of silver oxide and 4.0 g. of magnesium sulfate to effect the oxidation of the dissolved hydroquinone. The solution was finally filtered (norite), and concentrated to dryness. The solid yellow residue obtained at this point was crystallized from benzene-ligroin and gave 1.75 g. of material melting at 138–141°.

26. 9-(2-methyl-1,4-naphthoquinonyl-3)-pelargonic acid ethyl ester

A solution of 2.74 g. of 2-methylnaphthoquinone and 7.30 g. of disebacoyl peroxide diethyl ester in 20 cc. of glacial acetic acid was warmed to 85°, at which point the evolution of carbon dioxide commenced. Heating was then discontinued, and the reaction was allowed to proceed spontaneously. When the solution of carbon dioxide had ceased, the solution was cooled, diluted with ether, and washed with water to remove the bulk of the acetic acid. The unreacted methylnaphthoquinone was then extracted with 2% potassium hydroxide after reduction to the hydroquinone with sodium hydrosulfite. When no further color could be extracted with alkali, the ether phase was separated, and the dissolved product was oxidized back to the quinone by shaking with silver oxide and anhydrous magnesium sulfate. The resulting yellow solution was then filtered (norite), the solvent was removed under reduced pressure, and the slightly oily residue was crystallized from ligroin, yielding 2.31 g. of material melting at 63.6–65.0°.

27. 2-methyl-3-isobutyl-1,4-naphthoquinone

A solution of 2.9 g. of isovaleryl chloride in 25 cc. of propionic acid was cooled in ice and 0.98 g. of $Na_2O_2$ was added with shaking. There was instantaneous precipitation of a white solid (probably NaCl). The mixture was shaken for five minutes until all the $Na_2O_2$ was used. 1.74 g. of 2-methylnaphthoquinone was added and the mixture was heated on the steam bath; gas appeared at 60°; the temperature rising to 97° with brisk evolution of gas. Reaction was over in 15 minutes. After heating 15 minutes longer the solution was filtered, diluted, and cooled, when 0.9 g. of crystalline 2-methyl-3-isobutyl-1,4-naphthoquinone (M. P. 123°) separated.

28. 2-hydroxy-3-methyl-1,4-naphthoquinone (Phthiocol)

A solution of 2-hydroxy-1,4-naphthoquinone and diacetyl peroxide in acetic acid was heated at about 85–95° C. When the reaction was complete the mixture was poured into water and the precipitated 2-hydroxy-3-methyl-1,4-naphthoquinone was filtered off.

29. 2-hydroxy-3-ethyl-1,4-naphthoquinone

Made by heating 2-hydroxynaphthoquinone with dipropionyl peroxide in acetic acid at about 90–95° C.

30. 2-hydroxy-3-isobutyl-1,4-naphthoquinone

Made by heating 2-hydroxynaphthoquinone with the peroxide of isovaleric acid in acetic acid at about 90–95° C.

31. 2-hydroxy-3-undecyl-1,4-naphthoquinone

Made by heating 2-hydroxynaphthoquinone with the peroxide of lauric acid in acetic acid at 85–95° C.

32. 2-hydroxy-3-tridecyl-1,4-naphthoquinone

Made by heating 2-hydroxynaphthoquinone with the peroxide of myristic acid in acetic acid at 85–95° C.

33. 2-hydroxy-3-pentadecyl-1,4-naphthoquinone

Made by heating 2-hydroxynaphthoquinone with dipalmitoyl peroxide in acetic acid and ligroin at 85–95° C.

34. 2-hydroxy-3-heptadecyl-1,4-naphthoquinone

Made by heating 2-hydroxynaphthoquinone with distearoyl peroxide in acetic acid and ligroin at 85–95° C.

35. 2-hydroxy-3-p-bromophenyl-1,4-naphthoquinone

Made by heating 2-hydroxynaphthoquinone with the peroxide of p-bromobenzoic acid in acetic or propionic acid at 105–115° C.

36. 2-hydroxy-3-o-nitrophenyl-1,4-naphthoquinone

Made by heating 2-hydroxynaphthoquinone with the peroxide of o-nitrobenzoic acid in acetic acid at 105–115° C.

37. 2-hydroxy-3-p-nitrophenyl-1,4-naphthoquinone

Made by heating 2-hydroxynaphthoquinone with the peroxide of p-nitrobenzoic acid in acetic acid at 105–115° C.

38. 9-(2-hydroxy-1,4-naphthoquinonyl-3)-pelargonic acid ethyl ester 2-hydroxy-1,4-naphthoquinone (12.2 g.) and disebacoyl peroxide diethyl ester (32.0 g.) were dissolved in 125 cc. of glacial acetic acid and the temperature of the solution was brought to 90°. Evolution of carbon dioxide set in, and the exothermic reaction was moderated by occasional cooling in water. After the evolution of gas had subsided, the mixture was heated to the boiling point for a few minutes and then cooled in ice and filtered from 2.16 g. of unreacted hydroxynaphthoquinone. The filtrate was diluted with ether, and the bulk of the acetic acid was washed out with large volumes of water, followed by repeated extraction with 10% potassium bicarbonate to remove the last traces of hydroxynaphthoquinone. The alkylated product is much less soluble in bicarbonate than is hydroxynaphthoquinone itself. The resulting ethereal solution was dried over anhydrous magnesium sulfate, and the ether was removed under reduced pressure. The residual oil obtained in this way was diluted with a small amount of ligroin, and, on cooling in ice, 12.0 g. of bright yellow product melting at 65.2–68.9° was deposited. Four recrystallizations from ligroin gave yellow microscopic prisms, M. P. 69.9–71.0°.

39. 2-pentadecyl-1,4-naphthoquinone

This substance was made from 1,4-naphthoquinone and dipalmitoyl peroxide by the procedure of Example 8.

40. 2-acetylamino-3-methyl-1,4-naphthoquinone

A solution of 1.0 g. of 2-acetylamino-1,4-naphthoquinone and 0.48 g. of malonic acid in 50 ml. of glacial acetic acid was treated at 60–70 degrees with 2 g. of lead tetraacetate. A flocculent white precipitate began forming at once with the simultaneous evolution of $CO_2$. Heating at this temperature was continued for 4 hours, during which time a total of 10 gm. of lead tetraacetate was used up. The dark reaction mixture was filtered from undissolved lead salts and ice was added to the filtrate. The bright yellow crystalline solid which separated weighed 0.78 g. and melted at 148–155 degrees. A Craven test showed an almost imperceptible blue. This crude material was dissolved in 3 moles concentrated sulfuric acid without heating and allowed to stand overnight. The dark red acid solution was then poured over ice and the resultant orange-red micro needles of 2-amino-3-methyl-1,4-naphthoquinone collected: Weight: 0.46 g. M. P. about 160 degrees. This material was recrystallized to a constant melting point of 165.9–166.3° from methanol.

41. Tribromotoluquinone

A mixture of 2.4 g. of tribromo-1,4-benzoquinone, 0.85 g. of diacetyl peroxide and 24 cc. of acetic acid was warmed gently in a water bath. Solution soon took place and the temperature was slowly raised to 90° C. and kept there for one hour and at 100° C. for one-half hour longer, when effervescence had ceased. Pale yellow plates of tribromotoluquinone crystallized from the solution on cooling.

42. Tetramethyl-1,4-benzoquinone (duroquinone)

This substance was made by heating trimethyl-1,4-benzoquinone with diacetyl peroxide in ligroin.

43. Trimethyl-pentadecyl-1,4-benzoquinone

This substance was made by heating trimethyl-1,4-benzoquinone with dipalmitoyl peroxide in ligroin.

44. 2-methyl-3,5-dimethoxy-1,4-benzoquinone

This substance was made by heating 2,5-dihydroxy-1,4-benzoquinone with diacetyl peroxide in acetic acid.

45. 2,5-dihydroxy-3-undecylbenzoquinone 0.870 g. of 2,5-dihydroxybenzoquinone and 2.75 g. of dodecanoyl peroxide (lauroyl peroxide) were heated in 60 ml. of glacial acetic acid in water bath at 90–95° C. for 1.5 hours.

Upon standing overnight the reaction mixture deposited a crystalline substance which was filtered off. (Starting quinone+disubstituted quinone.) The filtrate was diluted with 250 ml. of ether and washed four times with 100 mls. of water. The ethereal solution was dried over anhydrous calcium chloride, and concentrated to small volume in vacuo. The 2,5-dihydroxy-3-undecylbenzoquinone which separated on concentration of the solution was recrystallized from 95% ethanol and finally from benzene, M. P. 146–147° C.

46. 2,5-dihydroxy-3-dodecylbenzoquinone 2.0 g. dihydroxybenzoquinone were dissolved by warming in 150 ml. of glacial acetic acid. The solution was allowed to cool and 6.0 g. of tridecanoyl peroxide was added and the reaction mixture heated to 90° C. The temperature was maintained at approximately this point until no more carbon dioxide was evolved.

The reaction mixture was allowed to cool until a precipitate appeared which was removed by filtration. On further cooling a second precipitation took place. This precipitate was filtered off and recrystallized from glacial acetic acid. M. P. 142–143°.

47. 2,5-dihydroxy-3-tridecylbenzoquinone 1.67 g. of 2,5-dihydroxybenzoquinone and 6.0 g. of tetradecanoyl peroxide (myristoyl peroxide) in 85 mls. of glacial acetic acid were warmed on a hot plate. Solution of the reactants was complete at 85–90° C. and evolution of carbon dioxide began at 90° C. The reaction mixture was heated until gas evolution ceased (maximum temperature 115° C.).

Upon cooling a precipitate came down which was removed by filtration. It was recrystallized from methanol, benzene and finally from glacial acetic acid. M. P. 137–139° C.

48. 3,6-diphenyl-2,5-dihydroxy-1,4-benzoquinone

This substance was made from 2,5-dihydroxybenzoquinone and dibenzoyl peroxide by the procedure of Example 40.

49. 3-pentadecyl-2,5-dihydroxy-1,4-benzoquinone

This substance was made from 2,5-dihydroxybenzoquinone and dipalmitoyl peroxide by the procedure of Example 40.

50. 2,5-dibromo-3,6-di($\beta$-phenylethyl)benzoquinone 1.335 g. of 2,5-dibromobenzoquinone was dissolved in 100 cc. propionic acid, heated to 120–130°, and 3.28 g. hydrocinnamoyl peroxide added. After a short induction period, vigorous evolution of gas occurred, which, however, did not become violent enough with these quantities to require cooling, or even a reflux condenser. The temperature was maintained at 130–140° for 7 hours to insure the complete decomposition of the peroxide.

The solvent was removed with aspirator vacuum with 70° bath temperature until the residue was quite syrupy. On standing overnight it formed a mush of crystals which was collected on a filter by washing with small portions of absolute alcohol. The crude material, 1.18 g. (51% theory) melted 140–147.4°. Recrystallization from 70 cc. absolute alcohol yielded 0.95 g. melting 147.2–149.3°.

The pure material melts 148.5–149.5° C. corr. It crystallized in well-defined golden yellow needles from absolute alcohol. It is insoluble in water, but fairly soluble in ether, chloroform, and hot organic acids.

51. Alkylation of 2,5-dibromobenzoquinone with m-methoxy hydrocinnamoyl peroxide 0.43 g. of 2,5-dibromobenzoquinone and 1.26 g. m-methoxy hydrocinnamoyl peroxide were dissolved in 25 cc. glacial acetic acid with heating on the steam bath. The solution gradually turned orange and then rather suddenly a deep wine-red at 90°. At this temperature a slow evolution of gas occurred, lasting for 10 minutes. Heating was continued for ½ hour but no further change took place. On cooling in ice no precipitate appeared. The solvent was removed by vacuum distillation, yielding a deep red viscous oil from which a few crystals separated overnight. Stirring of the mixture with 5 cc. alcohol produced more precipitate; filtration yielded a red crystalline product of M. P. 145–147°. This was recrystallized once from alcohol, giving 30 mg. of very fine bright orange needles, M. P. 150.2–151.4° (corr.).

When the carboxylic acid decomposition is effected in the presence of the 5,8-dihydro derivative of a 1,4-naphthoquinone, the latter acts both as a promoter of the reaction and as acceptor of the organic radical of the carboxylic acid, resulting in the production of the substituted derivative of the corresponding aromatized quinone, as illustrated in the following examples:

52.—0.70 g. of 2-methyl-5,8-dihydro-1,4-naphthohydroquinone in 15 cc. of acetic acid was heated on a steam bath with 7.58 g. of lead tetraacetate for 7 hours. The reaction mixture was precipitated with water, extracted with ether and crystallized from methanol. 0.21 g. of 2,3-dimethyl-1,4-naphthoquinone, M. P. 124–125° C. was obtained.

53.—1.43 g. of 2,6,7-trimethyl-5,8-dihydro-1,4-naphthohydroquinone was methylated with lead tetraacetate by the procedure of Example 51. Crystallization of the reaction product from methanol gave well-formed yellow crystals of 2,3,6,7-tetramethyl-1,4-naphthoquinone melting at 167–168.5° C.

I claim:

1. Method of substituting a nuclear hydrogen of a quinone by an organic radical which comprises decomposing with liberation of carbon dioxide a carboxylic acid compound selected from the group consisting of peroxides and tetravalent lead compounds of carboxylic acids in the presence of a quinone having at least one unsubstituted hydrogen in the quinonoid ring.

2. Method of substituting a nuclear hydrogen of a quinone by an organic radical which comprises heating to a temperature of about 50° to 150° C. in a liquid medium a carboxylic acid compound capable of decomposing with liberation of carbon dioxide under said conditions selected from the group consisting of peroxides and tetravalent lead compounds of carboxylic acids in the presence of a quinone having at least one unsubstituted hydrogen in the quinonoid ring.

3. Method of substituting a nuclear hydrogen of a quinone by an organic radical which comprises heating to a temperature of about 50° to 150° C. in a liquid medium a carboxylic acid compound capable of decomposing with liberation of carbon dioxide under said conditions selected from the group consisting of peroxides and tetravalent lead compounds of carboxylic acids in the presence of a quinone having at least one unsubstituted hydrogen in the quinonoid ring and in the presence of a promoter substance.

4. Method of substituting a nuclear hydrogen of a quinone by an organic radical which comprises heating to a temperature of about 50° to 150° C. in a liquid medium a tetravalent lead compound of a carboxylic acid containing at least two carbon atoms in the presence of a quinone having at least one unsubstituted hydrogen in the quinonoid ring.

5. Method of substituting a nuclear hydrogen of a quinone by an organic radical which comprises heating to a temperature of about 50° to 150° C. in a liquid medium a carboxylic acid containing at least two carbon atoms and a tetravalent oxide of lead in the presence of a quinone having at least one unsubstituted hydrogen in the quinonoid ring.

6. Method of substituting a nuclear hydrogen of a quinone by an organic radical which comprises heating to a temperature of about 50° to 150° C. in a liquid medium a carboxylic acid containing at least two carbon atoms and red lead in the presence of a quinone having at least one unsubstituted hydrogen in the quinonoid ring.

7. Method of substituting a nuclear hydrogen of a quinone by an organic radical which comprises heating to a temperature of about 50° to 150° C. in a liquid medium a peroxide of a carboxylic acid containing at least two carbon atoms in the presence of a quinone having at least one unsubstituted hydrogen in the quinonoid ring.

8. Method of alkylating quinones which comprises decomposing with liberation of carbon dioxide a carboxylic acid compound selected from the group consisting of peroxides and tetravalent lead compounds of alkyl carboxylic acids in the presence of a quinone having at least one unsubstituted hydrogen in the quinonoid ring.

9. Method of alkylating quinones which comprises heating to a temperature of about 50° to 150° C. in a liquid medium an alkyl carboxylic acid compound capable of decomposing with liberation of carbon dioxide under said conditions selected from the group consisting of peroxides and tetravalent lead compounds of alkyl carboxylic acids in the presence of a quinone having at least one unsubstituted hydrogen in the quinonoid ring.

10. Method of alkylating quinones which comprises heating to a temperature of about 50° to 150° C. in a liquid medium an alkyl carboxylic acid compound capable of decomposing with liberation of carbon dioxide under said conditions selected from the group consisting of peroxides and tetravalent lead compounds of alkyl carboxylic acids in the presence of a quinone having at least one unsubstituted hydrogen in the quinonoid ring and in the presence of a promoter substance.

11. Method of alkylating quinones which comprises heating to a temperature of about 50° to 150° C. in a liquid medium a tetravalent lead compound of an alkyl carboxylic acid in the presence of a quinone having at least one unsubstituted hydrogen in the quinonoid ring.

12. Method of alkylating quinones which comprises heating to a temperature of about 50° to 150° C. in a liquid medium an alkyl carboxylic acid and a tetravalent oxide of lead in the presence of a quinone having at least one unsubstituted hydrogen in the quinonoid ring.

13. Method of alkylating quinones which comprises heating to a temperature of about 50° to 150° C. in a liquid medium an alkyl carboxylic acid and red lead in the presence of a quinone having at least one unsubstituted hydrogen in the quinonoid ring.

14. Method of alkylating quinones which comprises heating to a temperature of about 50° to 150° C. in a liquid medium a peroxide of an alkyl carboxylic acid in the presence of a quinone having at least one unsubstituted hydrogen in the quinonoid ring.

LOUIS F. FIESER.